June 3, 1969
G. B. FOSTER
3,447,419
NON-CONTACTING TOOL TIP POSITIONING SYSTEM
Filed Feb. 21, 1967
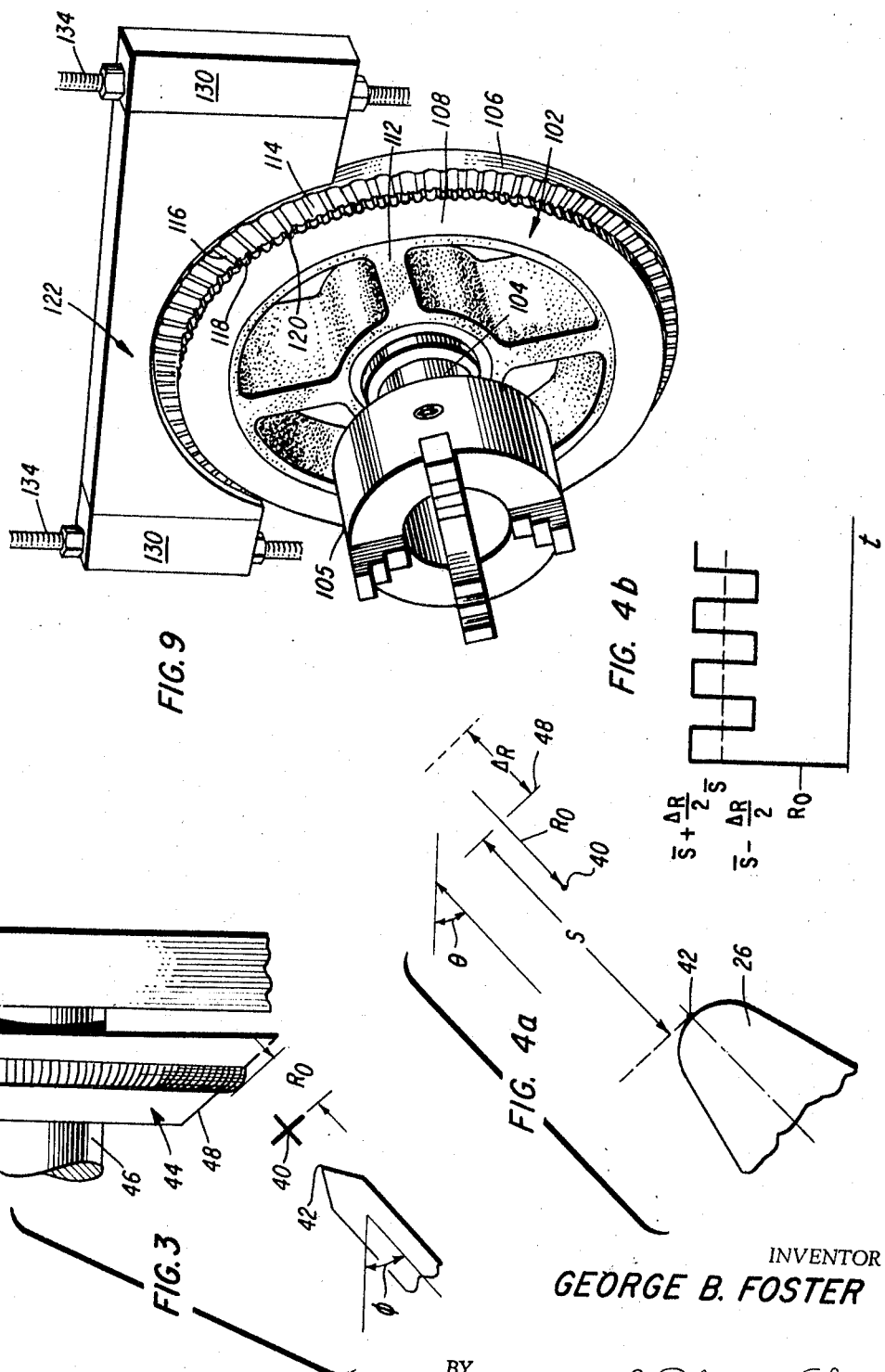
INVENTOR
GEORGE B. FOSTER
BY
Le Blanc & Shur
ATTORNEY

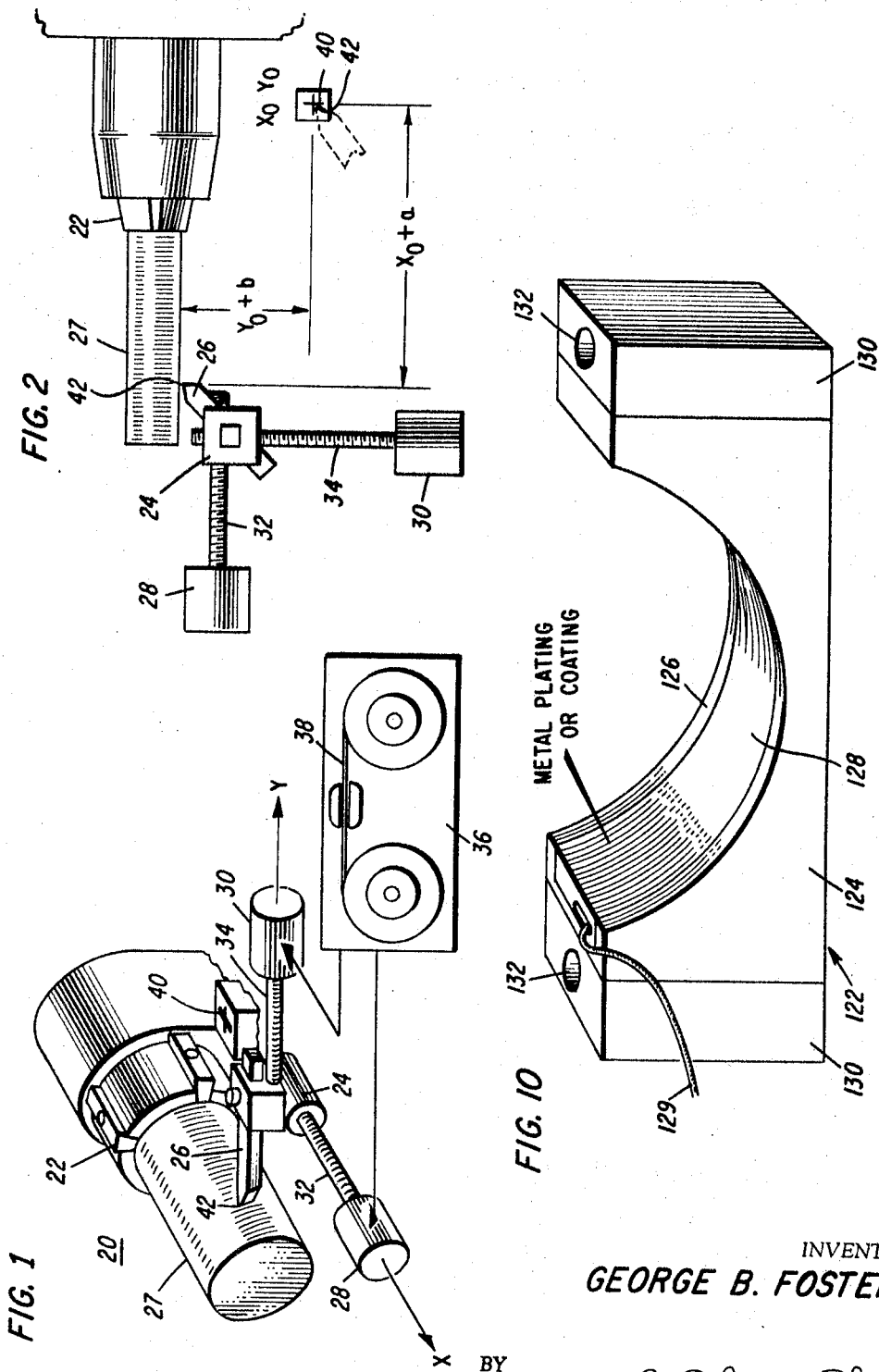

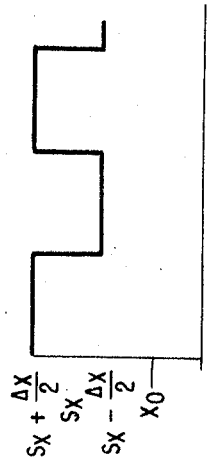
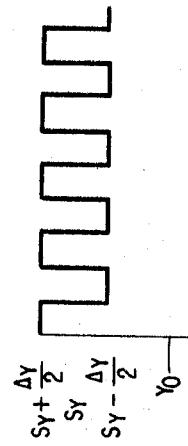
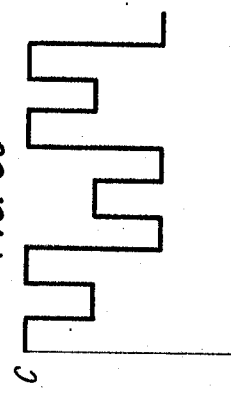
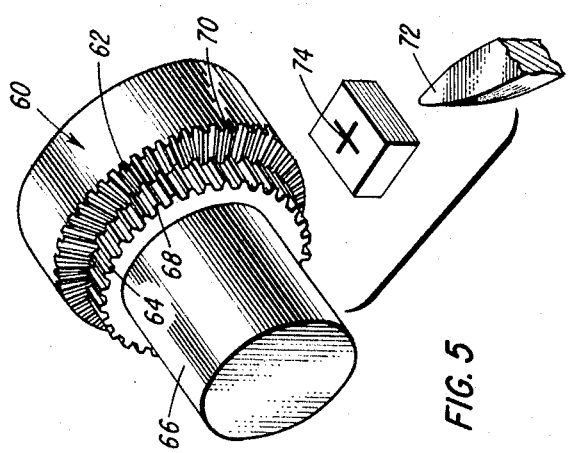
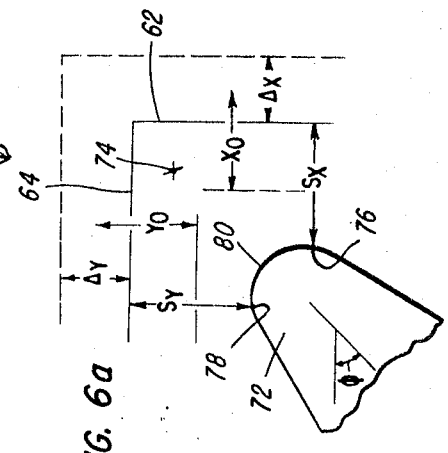

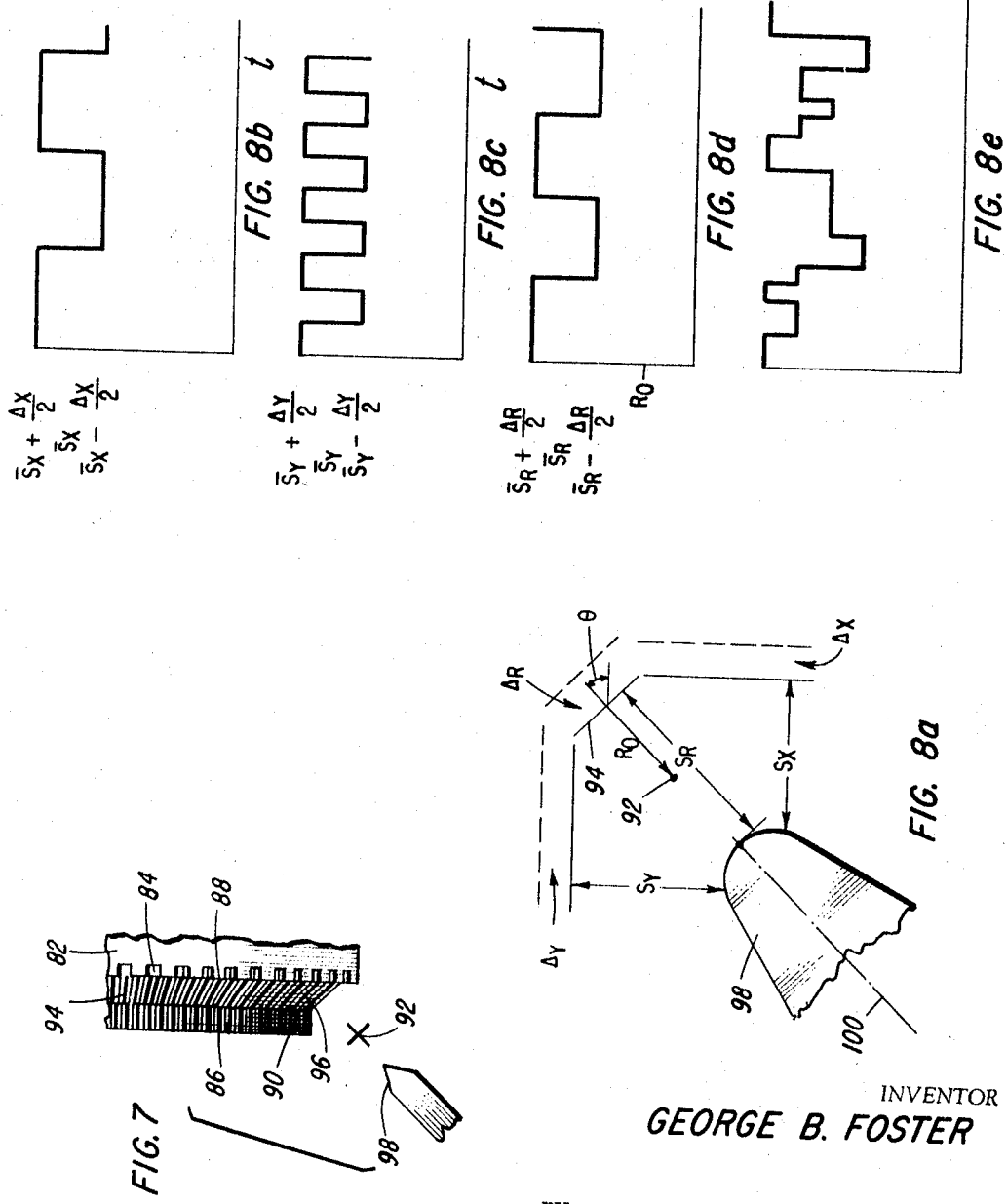

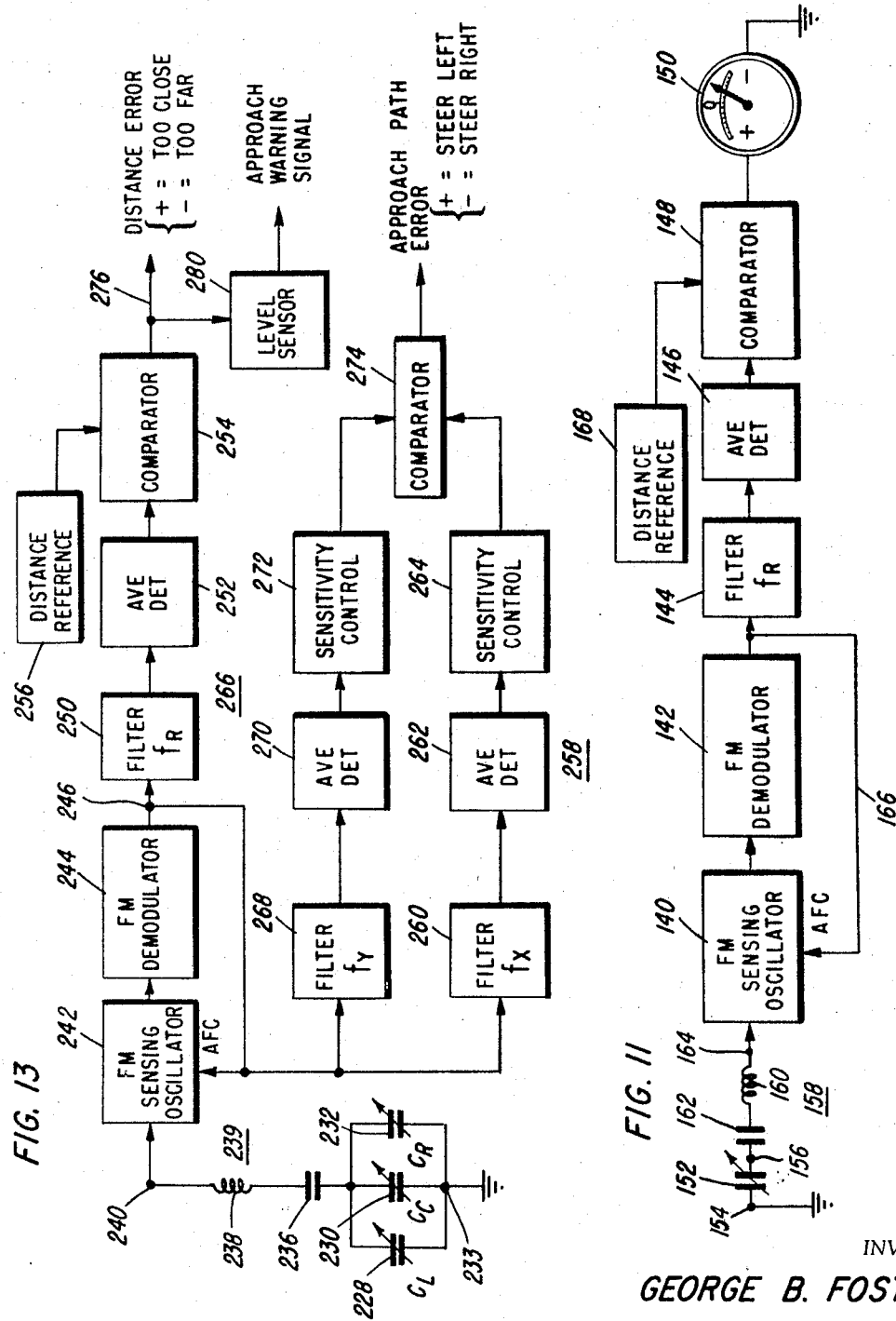

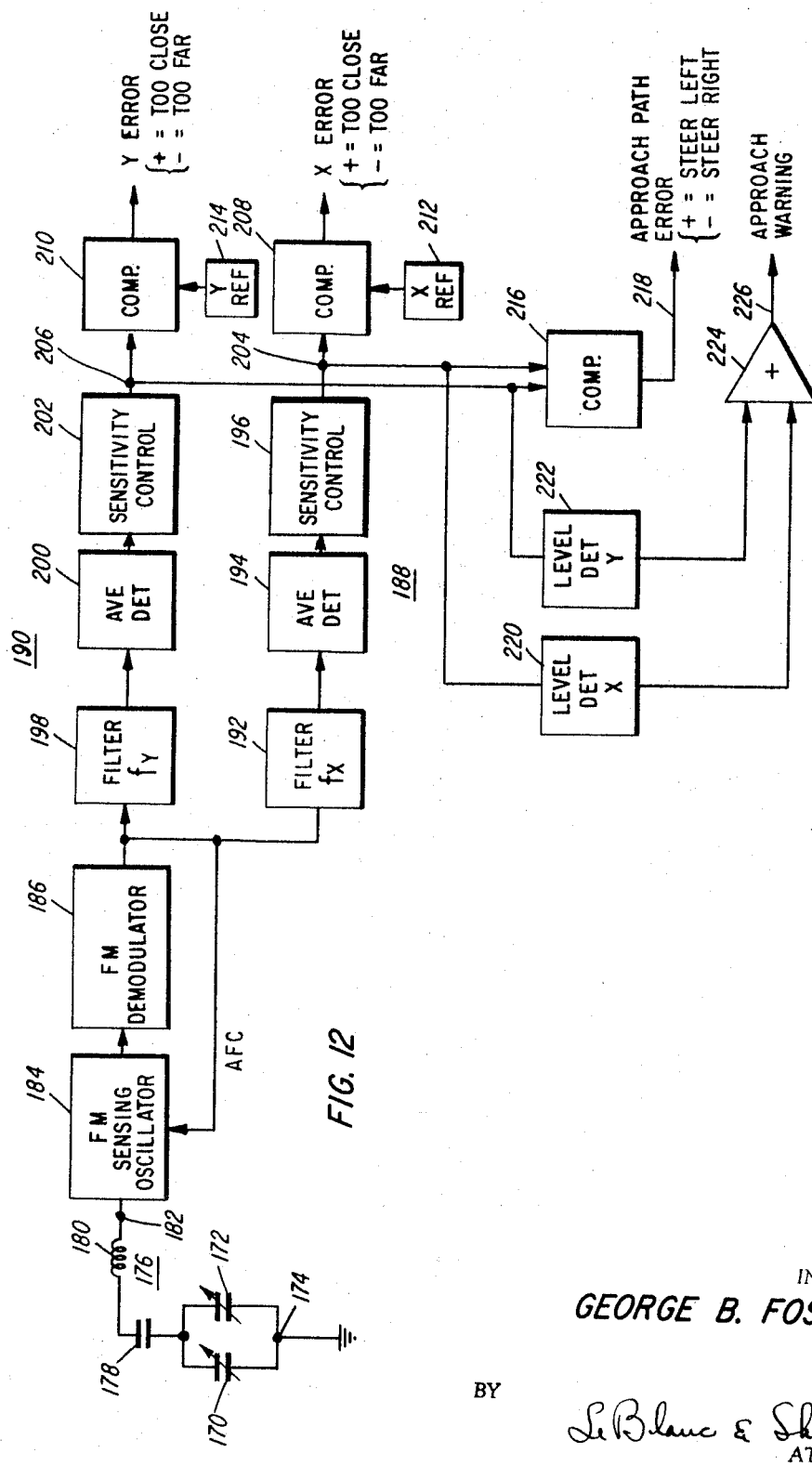

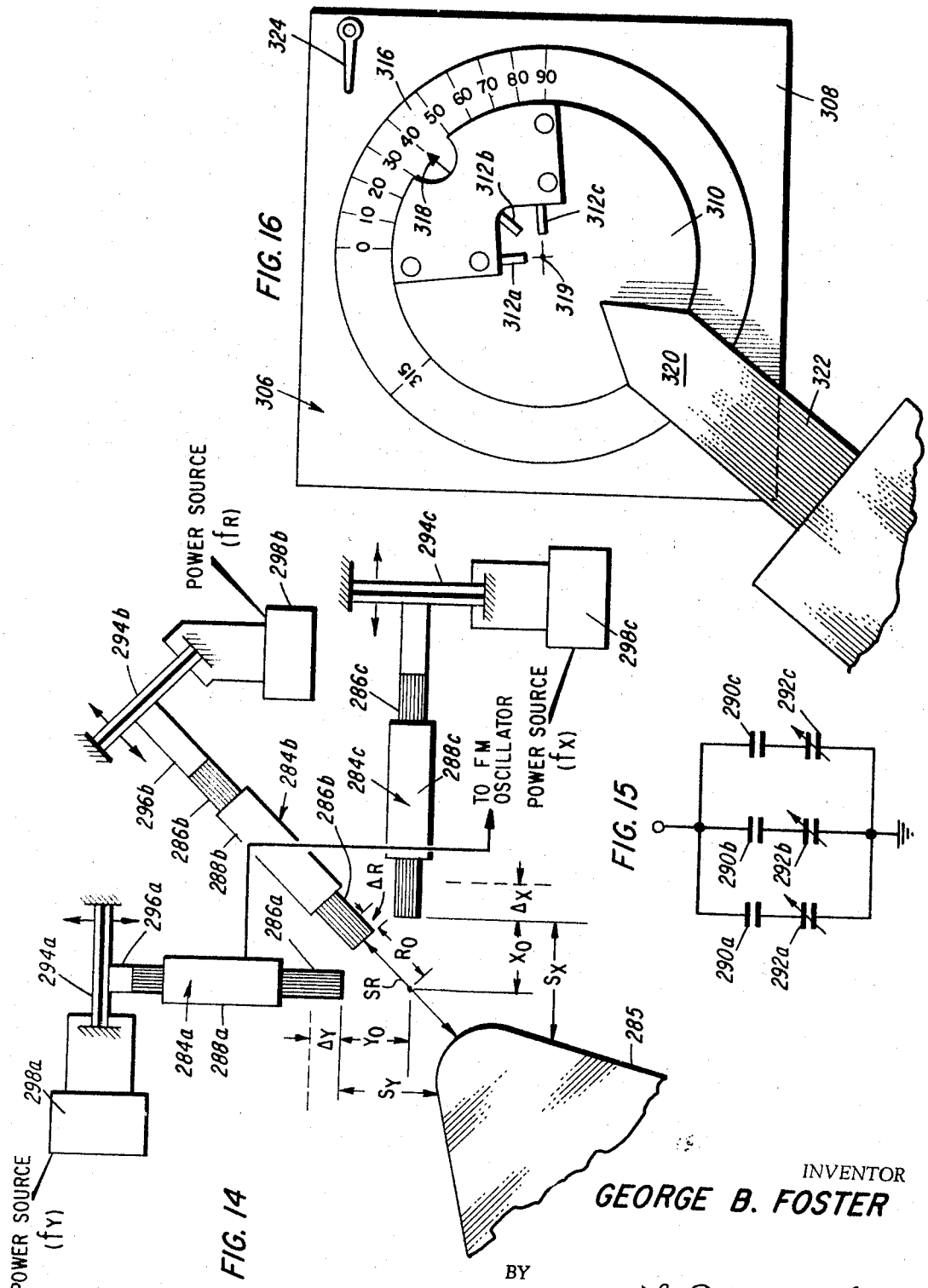

United States Patent Office 3,447,419
Patented June 3, 1969

3,447,419
NON-CONTACTING TOOL TIP POSITIONING SYSTEM
George B. Foster, Worthington, Ohio, assignor to Reliance Electric & Engineering Co., Columbus, Ohio, a corporation of Ohio
Filed Feb. 21, 1967, Ser. No. 617,549
Int. Cl. B23c 3/06; H02p 5/46
U.S. Cl. 90—13                         26 Claims

ABSTRACT OF THE DISCLOSURE

There is described below apparatus and method for the control of machine tools, particularly for positioning a cutting tool tip with high accuracy to establish a zero reference for the machine tool.

---

The present invention relates to the control of machine tools, and more particularly to the sensing and positioning of a cutting tool tip in accurate relation to a zero reference point.

Great advances have been made since the application of programmed machines to the automatic control of tools. Thus, it is now possible to obtain automatically controlled machines which operate in accordance with a preestablished program to mass-produce extremely complex parts quickly and with little variation between successive parts. However, the accuracy and repeatability of the operation of such tools depends in a large part on the ability to specify the sequence of cutting tool movements accurately with respect to a substantially invariant reference point.

Thus, at least once in the programmed sequence of operations, the exact location of the cutting tool tip must be determined with respect to a reference location. Then subsequent tool tip translations can be referred to the previously determined reference.

Typically this is accomplished by establishing some point, fixed with respect to the machine itself, as a zero reference and positioning the tool tip as precisely as possible in relation to this reference. Then the coordinates of the zero point (in the coordinate system of automatic tool controller) are stored in the system memory, and each successive tool tip translation may be referred to the stored reference, thereby achieving accurate positioning relative to that reference. Alternatively, only the initial translation may be referred to the zero reference, with subsequent translations defined in terms of departure from the preceding position. In either case, the establishment of an accurate zero point is essential.

A number of approaches to the solution of this problem have been suggested. For example, the simplest solution calls for establishment of the zero position by direct physical contact between the tool tip and an object, such as a fixed stop attached to the machine tool body. This is often done, but may result in a number of undesirable consequences. For example, with such a system it may be extremely difficult to ascertain that the tool tip is exactly aligned in all dimensions with the desired zero reference. Moreover, contact of the tool tip with the reference object may result in damage or misalignment of the tool tip or the reference point itself. Tool tip misalignment would result in an inaccurate location of the reference point, or an inaccurate cut, especially in high precision work. Similiarly, misalignment and/or damage to the reference member may destroy the validity of the reference position measurement. A modification of this has also been employed in which contact is established between the fixed stop and a variable indicator device fixed relative to the tool tip. This prevents damage and misalignment, but does not solve the problem of multidimensional inaccuracy.

Moreover, such systems do not permit compensation for small variations in geometry among similar tool tips, nor for geometry variation caused by tool wear. Thus, attempts have been made to find improved techniques which do not involve direct tool-to-reference contact.

Non-contacting systems are known in which the tool tip is visually aligned with a reference mark. In such systems, an operator employs a microscope or other optical instrument to guide the manual positioning of the tool tip over the desired reference point. Assuming the compensation for parallax or other optical variations, such a system is capable of providing reasonable accuracy. However, the required adjustments are quite tedious and time consuming. Moreover, since the ultimate adjustment depends on the subjective evaluation by the operator of the relative spacing between the tool tip and the reference point, the accuracy is inherently limited, both by the quality of the optics and by the skill of the operator. For these reasons, attempts have been made to provide automatic non-contacting positioning systems. Success in these areas has unfortunately been somewhat limited, especially in applications calling for extreme accuracy. For example, ultra-high precision operations may allow errors on the order of less than ±50 microinches. Previously available systems have not been able to provide the needed accuracy, reliably, time after time.

If the cutting tool is reusable, it has been a common practice to locate the cutting tool with respect to the reference point as well as possible, either manually or automatically, and then to perform a test cut on a piece of stock material of the type to be used. Any errors may then be corrected prior to initiation of production. This approach is entirely satisfactory in many instances, but suffers from the disadvantages of consumption of both time and stock material. The latter is especially critical where the stock material is quite costly, such as in the case of unusual alloys or other uncommon materials. Moreover, certain high precision applications are so critical that the cutting tool is discarded after a single cut. Thus, even the test cut method cannot be employed, and it is evident that there is a need for further improvement in this area.

An additional difficulty with non-contacting systems, and with most contacting systems as well has been the inability, for various reasons, to establish the zero reference location as invariant with respect to the work piece itself or at least to the work piece holder. Thus, during operation, dimensional variation in the tool spindle due to dynamic forces (e.g. spindle growth) may alter the relationship between the tool tip at the zero reference location and the work piece causing inaccuracy in the finished piece. Similar inaccuracy may result from bending or dimensional changes in the machine frame.

An accurate zero positioning system would provide the additional benefit of convenient measurement of tool wear after a succession of cuts. Specifically, after the zero referece has been established, and its coordinates for a particular tool tip memorized, the tool carriage may be returned to the memorized coordinates and tool tip position relative to the zero reference noted. Any departure from the previously established values will be indicative of tool tip wear. If the system is sufficiently directional, not only the amount of wear, but also the uniformity of such wear can be ascertained. Thus, it is possible to determine whether the tool wear requires only a change in the zero reference or whether it is necessary to resharpen or discard the worn tool.

In the present invention, the above-stated desirable features are accomplished by a system adapted to sense and measure with extreme accuracy energy effects which vary as a function of the tool tip position with respect to the zero reference point. The system may readily be employed to establish the zero reference point with respect to the tool spindle itself and under dynamic conditions to prevent inaccuracy due to dimensional variations in the machine tool. The inventive system employs sensing elements of novel and advanced design, coupled with properly chosen circuit configurations to process the measured information and to present it in a format compatible with manual or automatic operation. It has been found that sensing means useful in accordance with the principles of the present invention may be adapted to respond to acoustic energy, electrical energy, magnetic energy, or electromangetic energy of all frequencies, in short, any field manifestations which may be made to vary in a measurable way as a function of the relative position of two or more non-contacting but closely spaced bodies. Thus, the sensors may be characterized by capacitance or inductance, which varies as a function of tool tip position, by sensitivity to varying reluctance or other magnetic effects, as a function of distance, or by varying mechanical response to acoustic pressure, the amplitude of which is a function of the tool tip position.

By appropriate choice of circuit configurations and by appropriate deployment of the desired number of sensors, it has been found possible to ascertain the location of the tool tip in three dimensions with an accuracy of ±25 microinches, as well as to measure the contour of the tool tip with sufficient accuracy to permit a reasonable assessment of the uniformity of tool wear, all without the requirement of contact between the sensor and the tool tip. The system may readily be adapted to provide an electrical output which is a linear function of the tool tip to sensor distance, e.g., to facilitate manual operation. By proper processing of the field variation measurements, great directional sensitivity is obtained. The system has been found to be useful in contaminated as well as in clean environments, and to provide overall convenience and flexibility heretofore unavailable.

Briefly, the system comprises one or more sensors, means for establishing an appropriate field between the tool tip and the sensors and means to impart an identifying characteristic to field variations caused by relative movement between the tool tip and each of the sensors. Electronic processing circuitry is associated with the sensors and serves to extract information associated with each identifying characteristic and exclude other information. Coordinate identification is preferably provided by the controlled modulation of the distance between the tool tip and the operative portion of the sensor. The tool tip to sensor distance information is recovered by sensing changes in the controlled modulation associated with each sensor. The distance information is then utilized to direct the movement of the tool tip until the desired position is achieved.

Accordingly, it is a general object of this invention to provide improved means for the automatic control of machine tools.

More particularly, it is an object of this invention to provide improved apparatus for locating the position of a tool tip with respect to a reference location.

It is also an object of this invention to provide apparatus for accurately establishing a zero reference for a machine tool, independent of dynamics or like variations in machine tool dimensions.

It is a further object of this invention to provide a tool positioner as described above including one or more highly directional sensors responsive to energy variations in space caused by relative movement between the tool tip and the sensors.

It is an additional related object of this invention to provide apparatus for accurately locating the position of a cutting tool tip in two or three coordinates with error as low at ±25 microinches.

It is an additional object of this invention to provide means for determining the contour of a cutting tool tip.

It is a related object of this invention to provide an improved zero positioner for an automatic machine tool which permits a rapid and accurate assessment of cutting tool wear by measurement of the contours of the cutting tool tip.

It is a further related object of this invention to provide an automatic tool tip positioner and tool wear indicator which responds to energy variations caused by relative movement between the tool tip and an array of directional sensors.

It is a further object of this invention to provide a tool tip position sensor in which the tool tip and one or more interrupted surfaces provide time varying capacity of known frequency and amplitude dependent upon the position of the cutting tool tip, which capacity variation serves to control the output of a frequency modulated oscillator, which in turn is appropriately processed to provide an indication of the distance between the tool tip and the zero reference.

The exact nature of this invention, as well as other objects and advantages thereof, will be understood from consideration of the following detailed description and the accompanying drawings, wherein:

FIGURE 1 is a fragmentary perspective drawing showing in schematic form the type of system to which the present invention pertains;

FIGURE 2 is a top plan view of a portion of FIGURE 1 which shows the manner in which the zero reference point is utilized;

FIGURE 3 shows one embodiment of a sensor for establishing the desired zero reference;

FIGURES 4a and 4b show the manner in which the sensor of FIGURE 3 is employed;

FIGURE 5 shows a modification of the sensor of FIGURE 3;

FIGURES 6a–6d show the manner in which the sensor of FIGURE 5 is employed;

FIGURE 7 shows a further modification of the sensor of FIGURE 3 which permits the establishment of a zero reference position, and also measurement of tool tip wear;

FIGURES 8a–8e show the manner in which the sensor of FIGURE 7 is employed;

FIGURES 9 and 10 are detailed drawings of a practical embodiment of the sensor shown in FIGURE 5;

FIGURE 11 is a block diagram of an electronic system suitable for use with the sensor shown in FIGURE 3;

FIGURE 12 is a block diagram of an electronic system suitable for use with the sensor shown in FIGURE 5;

FIGURE 13 is a block diagram of an electronic system suitable for use with the distance and tool tip wear sensor shown in FIGURE 7; and FIGURES 14–16 show a modified version of the sensor shown in FIGURE 7.

Turning now to FIGURE 1, there is shown an example of the type of system to which the present invention is directed. A machine tool, generally denoted at 20, is shown as a lathe, however, it should be understood that the following discussion is applicable to a milling machine, a drill press, or any other automated machine tool for which a zero reference point is desired.

Essentially, lathe 20 comprises a workpiece holder such as geared chuck 22, mounted on a spindle and adapted for rotation by a driving means such as an electric motor (not shown) and including a movable tool carriage 24 for supporting a cutting tool 26 in operative relationship with a workpiece 27. As shown, carriage 24 is adapted for translational movement in two directions, i.e., in an X direction, parallel to the workpiece 27, and in the Y direction, normal to the workpiece 27. Translation of tool carriage 24 is accomplished in any suitable fashion, as by a pair of driving motors 28 and 30 connected to the tool carriage through a pair of lead screws 32 and 34, respectively. As will be understood, motors 28 and 30 may be of any conventional or desired type, including servomotors and digital step motors. In any event, motors 28 and 30 are operated by an electronic controller 36 which responds to a prerecorded program contained on an input tape 38. Controller 36 may be of the analog type, i.e., conventional feedback control system type, or may be a numerical control system, i.e., a special purpose digital computer. Information bearing tape 38 may be of the magnetic or punched paper type, or of any other type compatible with controller 36.

A zero point 40, fixed relative to the machine tool 20, serves as the reference for tool tip translation under direction of controller 36. The present invention is concerned primarily with the accurate measurement and positioning of the cutting tool 26 with respect to reference point 40.

The advantages of accurate location of the cutting tool 26 relative to reference point 40 may best be understood from consideration of FIGURE 2 which shows a top plan view of machine tool 20 at the commencement of a cutting operation. Information as to the required location of the tip 42 of cutting tool 26 is, of course, provided by tape 38 (see FIGURE 1). One appropriate format for this information is a definition of the tool tip position in terms of its coordinates in a rectangular system. Zero point 40 is assumed to haxe X and Y coordinates in such a system of $X_0$ and $Y_0$. Thus, the position of tool tip 42, as shown in FIGURE 2, is defined by X and Y coordinates of $X_0+a$ and $Y_0+b$. Then, subsequent cuts are located by rectangular translation of the cutting tool from the point $(X_0+a, Y_0+b)$.

While it is a straight-forward matter to assign appropriate coordinates to a sequence of cutting tool positions, and to translate the tool tip from one position to the next, accurate machining of workpiece 27 will not result unless the tool is located accurately for the first cut. This is readily achieved if carriage 24 can be positioned so tool tip 42 is exactly aligned with zero reference point 40, as shown in outline in FIGURE 2. Unfortunately, systems providing the required accuracy have not been available.

In the present system, it will be assumed that tool carriage 24 is disposed at a fixed elevation whereby it is only necessary to locate the tool tip position in two dimensions, namely, at coordinates $X_0$ and $Y_0$. Of course, in some cases it may be necessary to control the vertical coordinate, e.g., $Z_0$, as well as the two horizontal coordinates. The technique of the present invention as set forth below is directly adaptable to such requirements.

As stated above, in certain high precision applications, it may be essential that tool tip 42 be aligned relative to reference point 40 with an error not exceeding ±25 microinches. Such accuracy is achieved in the present invention by the establishment of an energy field in the space surrounding tool tip 42, and by the utilization of advanced sensors which respond with great accuracy to field perturbations caused by relative movement between the tool tip and the sensors.

One type of field useful according to this invention is that associated with electrical energy stored in the space between two or more closely proximate but non-contacting electrically charged bodies. The elements of one basic system adapted to measure such energy are shown in FIGURE 3. The system comprises a reference member, such as ring 44, rigidly mounted for rotation on the machine tool spindle, here shown at 46. Ring 44 is preferably in the form of a truncated cone and is positioned so that the conic surface 48 tapers toward the chuck supporting end of spindle 46. Ring 44 may be tapered at any desired angle, or may be substantially cylindrical though an angle of 45° is preferred since it results in greatest latitude in the choice of the angle $\phi$ (referring to the longitudinal axis of spindle 46) at which tool tip 42 may approach the zero reference point 40.

Either reference ring 44 or cutting tool 26 (or both) is insulated from ground so that an electric field can exist in the space separating the two bodies. Thus, should an electric potential difference be established between the bodies, the resulting current flow is found to be a relatively complex function of the composition and geometries of the tool tip 42 and the reference ring 44 as well as upon the instantaneous standoff distance S between them. For present purposes, however, it is sufficient to consider that the current magnitude I is related to the potential difference V by a relationship in the form of:

$$I = C\frac{dV}{dt} \qquad (1)$$

where C is inversely related to some function of S. This relationship is found to characterize the electrical properties of the system with sufficient accuracy as long as the distance between the reference ring 44 and the tool tip 42 is small in comparison to the frequency, i.e., rate of change, of the exciting voltage divided into the velocity of wave propagation. In effect, therefore, the structure of FIGURE 3 is equivalent to a non-linear, variable electrical capacitance, the value of which can be measured by attaching electrical leads to cutting tool 26 and reference ring 44.

As previously mentioned, one of the principal problems in the design of non-contacting type tool positioners has been in devising systems of extremely high accuracy. In accordance with the embodiment of FIGURE 3, this is overcome by the novel design of conic surface 48 of reference ring 44. Thus, there is provided a series of tooth-like serrations 50 uniformly spaced around the periphery of surface 48. Serrations 50 are of substantially identical height ΔR, and may be provided by small preformed members attached to ring 44. Preferably, however, they are formed by machining of conic surface 48. In either event, when ring 44 is rotated and viewed along a line normal to surface 48, the latter appears to be interrupted or to "oscillate" back and forth along the normal with a total excursion ΔR. While apparent amplitude of oscillation may depend on the angular position of the viewpoint relative to the surface, the frequency $f_R$ will depend only on the product of the number of serrations and the speed of rotation of the reference surface.

FIGURES 4a and 4b show the manner in which interrupted surface 48 serves as a non-contact sensor for the position of tool tip 42. In FIGURE 4a, the zero reference point 40 is defined vectorially in terms of a known average distance $R_0$ from reference ring 44 and a desired angle $\theta$ between the axis of cutting tool 26 and a reference axis parallel to machine tool spindle 46. ($R_0$ can only be defined as an average distance since reference surface 48 "oscillates" over a distance ΔR due to the presence of serrations 50.) For proper orientation, the standoff distance S between tool tip 26 and reference surface 48 must be adjusted so that the average value $\overline{S}=R_0$. Assuming that serrations 50 are uniformly spaced around reference ring 44, and that machine tool spindle 46 is rotated at a constant speed, it may be seen that for tool tip 42 in a fixed position, the instantaneous standoff distance S will vary over a range of ΔR at the frequency $f_R$ equal to the number of surface interruptions in reference ring 44 times the speed of rotation of spindle 46. This variation is shown in FIGURE 4b. Recalling the electrical relationship set forth in Equation 1, it may be understood that the rotation of reference ring 44 produces a periodically varying capacitance, the average value of which will depend on the mean standoff distance $\overline{S}$ between the reference ring and the tool tip.

As the standoff distance S is decreased, then the average capacitance will increase due to the relationship noted above. Having previously established the value of capacitance which results when the tool tip is positioned at a given standoff distance S, the distance between tool tip 42 and zero reference 40 may be determined by measurement of the capacitance in the novel manner described below. Thus, the system of FIGURE 3 may be incorporated in a closed loop system in which tool tip 42 is made to approach reference surface 44 until the desired standoff distance $R_o$ is achieved.

As explained hereinafter, the known variation in capacitance caused by the oscillation of amplitude $\Delta R$ may be used if desired to control system sensitivity to provide a linear relationship between an electrical output and the standoff distance.

The embodiment described above, in which reference ring 44 includes a single interrupted surface 48 is satisfactory for many purposes if coupled with an appropriate automatic control system or if employed manually by a sufficiently skilled operator. On the other hand, with such a system, it may be somewhat difficult to assure that tool tip 42 is accurately positioned at reference point 40 and not at some other point having an equal standoff distance $R_o$, due to limitations in the directionality to the sensor. It is, however, possible to devise an appropriate approach path locus, for example, in which tool tip 42 is translated back and forth across the approach path to cause equal variations in the capacitance, and to establish the desired approach path as corresponding to the locus of the null in capacitance variation. However, a more accurate result can be obtained with a modified reference ring such as shown in FIGURE 5.

Here, a reference ring 60, including two interrupted surfaces 62 and 64, is rigidly supported for rotation on a machine tool spindle 66. Reference surfaces 62 and 64 comprise a series of equally spaced serrations or teeth 68 and 70 of depth $\Delta X$ and $\Delta Y$, respectively. Teeth 68 extend radially and teeth 70 extend axially with respect to machine spindle 66. Thus, when reference ring 60 rotates, there will result a periodic variation in the axial position of reference surface 62 and an analogous variation in the radial position of reference surface 64. As explained in detail below, the oscillation of reference surfaces 62 and 64 is differentiated by preparing the surfaces with an unequal number of serrations, whereby the axial and radial frequencies of oscillation are different.

FIGURE 6a shows the manner in which the dual surfaced ring 60 is employed for precise location of a tool tip 72 with respect to a zero reference point 74. In contrast to the polar coordinate definition in the case of FIGURE 3, here, the instantaneous position of tool tip 72 is defined in terms of the distances $S_X$ and $S_Y$ from a pair of points 76 and 78 on the tool tip periphery to the reference surfaces 62 and 64 on ring 60. Similarly, zero reference point 74 may be defined in terms of a pair of distances $X_o$ and $Y_o$ from the mean positions of surfaces 62 and 64. It should be noted that the distances $X_o$ and $Y_o$ are not the coordinates of zero reference point 74 relative to the reference ring, but rather the mean distances between the points 76 and 78 and respective reference surfaces 62 and 64 which will result in a placement of the extreme point 80 on tool tip 72 directly above the reference point 74.

As in the case of single surface reference ring 44, rotating double surfaced ring 60 cooperates with tool tip 72 to provide means for producing an electric field capable of storing energy in the space between the bodies. Thus, if a voltage V is applied between tool tip 72 and ring 60, a current I will be produced having the form $$I = C\frac{dV}{dt} \qquad (2)$$

where C is inversely related to some function of $S_X$ and some function of $S_Y$. As in the case of Equation 1, Equation 2 adequately characterizes the electrical properties for frequencies such that $C/f$, where C is velocity of wave propagation in the intervening medium, is very large compared to $S_X$ and $S_Y$.

FIGURES 6b and 6c show the variation of $S_X$ and $S_Y$ for a given position of tool tip point 72. In FIGURE 6b, it may be seen that interrupted surface 62 causes a periodic variation of $\pm \Delta X/2$ about the mean standoff distance $\overline{S}_X$ at a frequency $f_X$ determined by the product of the number of teeth times the speed of rotation. Similarly, FIGURE 6c shows the periodic variation of $\pm \Delta Y/2$ about the mean standoff distance $\overline{S}_Y$ to reference ring 64, the frequency $f_Y$ again being given by the product of the number of teeth and the speed of rotation. However, comparing FIGURES 6b and 6c, it may be seen that frequency $f_X$ is about $\frac{1}{3} f_Y$. This permits separation of the separation of the apparent variations of $S_X$ and $S_Y$ and independent measurement of the two distances.

With the above-described apparatus, it has been found that the capacitance between the tool tip and the reference ring includes components at both frequencies $f_X$ and $f_Y$. Assuming substantially equal serration depth (i.e., $\Delta X = \Delta Y$), and the frequency relationship shown in FIGURES 6b and 6c, there will result a time variation of the capacitance having components at both of the frequencies shown in FIGURES 6b and 6c, with magnitude variation such as shown in FIGURE 6d.

Again, the amplitude of each frequency component is found to depend principally on the standoff distances $S_X$ and $S_Y$. Thus, by measuring the time varying component of capacitance at each frequency for the desired standoff distances $X_o$ and $Y_o$, it is possible to determine the arrival of tool tip point 80 over zero reference point 74 by adjusting the tool tip position in the X and Y directions until the desired values of capacitance are achieved.

The configuration shown in FIGURE 5 has been found to give outstanding results meeting the stringent tolerance requirements set forth above. In fact, use of this system is limited only by the requirement that any changes in the tool tip geometry, for example, due to wear, be substantially uniform around the tool tip periphery, at least between points 76 and 78. Thus, as long as it may be assumed either that there is substantially no tool tip wear or, alternatively, that any wear causes a substantially uniform reduction of tool tip radius, then an automatic control system can readily be designed to utilize the capacitance variations described above for accurately positioning tool tip 72.

Moreover, while the longitudinal axis of tool tip 72 is shown as bisecting the angle between the reference surfaces 62 and 64, i.e., an angle $\phi$ (shown in FIGURE 6a) equal to 45°, this is not required, nor is it required that the zero reference point 74 lie on the same bisector. Assuming, however, a placement of zero reference point 74 as shown in FIGURE 6a, an angle of $\phi$ different than 45° will affect only the ratio between the reference distances $X_o$ and $Y_o$. As explained in detail below, values of $\phi$ other than 45° can readily be accommodated by adjusting the sensitivity of the associated electronic system to the $f_X$ and $f_Y$ components of the capacitance variation caused by rotation of the reference ring. Similar results can be obtained for the case of displacement of zero reference 74 from the bisector, as will be understood.

If it is not possible to assume uniform or negligible tool wear, then inaccuracies may result from the use of the system of FIGURE 5. In that case, a modified system, a fragmentary view of which is shown in FIGURE 7, may be used.

Here, a three-surfaced reference ring 82 is substituted for the single or double surfaced reference rings of FIGURES 3 and 5. Ring 82 includes a first surface 84 identical to surface 62 on reference ring 60 (see FIGURE 5) and a second surface 86 identical to surface 64 on reference ring 60. Surfaces 84 and 86 each include a series of uniformly spaced serrations 88 and 90 having a depth $\Delta X$ and $\Delta Y$, respectively. As previously explained, rotation of reference ring 82 causes an apparent axial oscillation of surface 84 and a radial oscillation of surface 86 when viewed from the vicinity of the zero reference point 92.

Reference ring 82 includes, in ddition to reference surfaces 84 and 86, a third reference surface 94 defining a truncated conical portion of reference ring 82 intermediate surfaces 84 and 86. Surface 94 includes a series of uniformly spaced serrations 96 of depth $\Delta R$ extending axially along the surface, as shown in FIGURE 7. For convenience, serration depths $\Delta X$, $\Delta Y$, and $\Delta R$ may be chosen to be substantially equal, however, satisfactory operation can be obtained even if such equality is not maintained.

FIGURE 8a shows the manner in which reference ring 82 is used to achieve accurate positioning of a tool tip 98 over the zero reference point 92. As in the case of single surfaced ring 44 (see FIGURE 3), the position of the reference point 92 is defined as the mean distance $R_0$ to reference surface 94 and by the desired angle $\theta$ between the axis 100 of the tool tip 98 and the longitudinal axis of the tool spindle. As will be recalled, the difficulty with the embodiment of FIGURE 3 was stated to lie primarily in ascertaining with high precision the path along which the tool tip approaches the reference point to assure an accurate value of the angle $\theta$. This difficulty is overcome in the embodiment of FIGURE 7 by the provision of the X and Y reference surfaces 84 and 86, as explained in connection with FIGURES 8a–8e below.

Here, the tip 98 is shown approaching reference point 92 with axis 100 of an angle $\theta=45°$. Assuming oscillation of reference surfaces 84, 86 and 94 between the solid and dotted positions shown in FIGURE 8a, it will be understood that for $\Delta X$ and $\Delta Y$ approximately equal, the mean values $\overline{S_X}$ and $\overline{S_Y}$ of the standoff distances $S_X$ and $S_Y$ will be substantially equal. On the other hand, for a reference point 92 as shown in FIGURE 8a, should tool tip 98 be approaching along a path on which $\theta$ is not equal to 45°, the ratio $S_X/S_Y$ will depart from unity. This result is utilized as shown in FIGURES 8b through 8e, which figures show the apparent oscillation of reference surfaces 84, 86 and 94, respectively, as observed in the vicinity of the zero reference point 92. As in the case of the previously described embodiment, the capacitance distance relationship set forth in Equation 2 permits a determination of the position of tool tip 98 by a measurement of electrical properties.

As in the embodiment of FIGURE 5, the rotation of reference ring 82 will cause a separate component to be present in the current between reference ring 82 and tool tip 98 at each of the interruption frequencies associated with reference surfaces 84, 86 and 94. In FIGURE 8b is shown the variation of $S_X$, i.e., that associated with reference ring surface 84. In FIGURE 8c is shown the variation of $S_Y$ resulting from the serrations 90 on reference surface 86. For purposes of explanation, the number of serrations 90 on reference surface 86 is chosen to be three times the number of serrations 88 on reference surface 84, whereby $f_Y=3f_X$. Finally, in FIGURE 8d is shown the variation of $S_R$ associated with the oscillation of reference surface 94. Again, the number of serrations 96 on reference surface 94 must be different than the number on either of reference surfaces 84 or 86. Thus, for example, the number of serrations 96 on reference surface 94 may be ⅝ of the number of serrations 88 on reference surface 84, whereby $f_R=⅝f_X$. FIGURE 8e shows the combined effect of the three separate oscillations shown in FIGURES 8b through 8d.

The operation of the FIGURE 7 embodiment is discussed in detail below. Briefly, however, the capacitance variation associated with reference surface 94 serves to establish the desired standoff distance, while the ratio of the capacitance associated with the oscillation of reference surfaces 84 and 86 serves to generate "steer left" or steer right" signals when the ratio $S_X/S_Y$ departs from unity.

The above described embodiment has ben found to provide not only the extreme positional accuracy associated with the FIGURE 5 embodiment, but also to facilitate a convenient and rapid determination of tool wear should this be desired. Specifically, once the tool tip 96 has been properly positioned, the associated coordinates in the reference system of controller 36 (see FIGURE 1) are stored in an appropriate portion of the controller memory. Then, at some subsequent time after the tool has been used, motors 28 and 30 are commanded to reposition the tool tip at the previously memorized coordinates. Thus, separate measurement of the components at each of the three oscillation frequencies are used not only to determine the amount of tool wear (which would be generally indicated by changes in the standoff distance $S_R$), but also to determine the uniformity of such wear around the tool periphery (which would be indicated by the ratio of the standoff distances $S_X$ and $S_Y$).

It should be emphasized that any of the three above described embodiments may be satisfactorily used. However, the embodiment of FIGURE 5 with two reference surfaces has proven to be an especially satisfactory compromise in which high accuracy may be achieved with a minimum of circuit complexity, particularly for application involving negligible, or at least uniform, tool wear.

A commercially suitable embodiment of the two-surfaced reference ring shown in FIGURE 5 is shown in FIGURES 9 and 10. Here, a two-surface reference ring 102 is shown rigidly mounted on a machine tool spindle 104. As will be understood, a chuck 105, mounted on the spindle 104, extending to the left in FIGURE 9 serves to support the workpiece, while the opposite end of the spindle is attached to suitable driving means. Reference ring 102 is comprised of a pair of annular plate portions 106 and 108 mounted on a hub 110. In the embodiment shown, hub 110 is electrically isolated from the machine tool spindle 104, for example, by a separating dielectric layer 112, the composition of which is chosen to give maximum structural rigidity while at the same time having a sufficiently low dielectric constant to minimize the capacitance between reference ring 102 and spindle 104. (Alternatively, reference ring 104 may be directly mounted on the tool spindle, but this requires that the tool tip itself be electrically isolated from ground.) Preferably, a strong stiff insulating material, such as Mycalex or other similar rigid material having a dielectric constant of about 7 or less, should be employed.

As shown in FIGURE 9, reference ring 102 comprises a pair of annular plate portions 106 and 108 which are separately formed and connected together during assembly, though it may alternatively comprise a unitary structure in which plate portion 108 is machined to a smaller external diameter than plate portion 106.

Plate portion 106 includes a reference surface 114 having a plurality of uniformly spaced radial slots 116 which may be formed by milling or any other suitable technique. Similarly, plate portion 108 includes a reference surface 118 including a series of uniformly spaced slots 120 extending perpendicular to slots 118, i.e., in a direction parallel to the longitudinal axis of machine tool spindle 104. As previously explained, in order to differentiate between the two interrupted surfaces 114 and 118, the number of radial slots 116 is chosen to be unequal to the number of axial slots 120, whereby surfaces 114 and 118 appear to have unequal interruption frequencies.

A coupling shoe 122 provides an electrical takeoff for reference ring 102. Coupling shoe 122 is positioned in close proximity to reference ring 102 and serves to support an electrical pickoff as shown in detail in FIGURE 10. The coupling shoe 122 includes a center portion 124 having an arcuate cutout 126 of a radius of curvature slightly exceeding that of reference ring 102. The inner surface of arcuate cutout 126 is provided with a conductive strip 128 covering substantially its entire surface. A shielded cable 129 is connected in any suitable manner to conductive strip 128 and provides the sole electrical connection to reference ring 102. Attached to coupling shoe center portion 124 are a pair of end plates 130, each having a vertical bore 132 by which coupling shoe 122 is mounted.

Referring again to FIGURE 9, it may be seen that coupling shoe 122 is positioned in any convenient location, for example, above reference ring 102 on a pair of mounting columns 134 passing through bores 132 in end plates 130. Coupling shoe 122 is preferably mounted adjacent to the radially outer surface of annular plate portion 106. The width of coupling shoe 122 should be about equal to the thickness of plate portion 106 in order to minimize the stray effects of the interruptions on surfaces 106 and 108.

Coupling shoe 122 is located in close poximity to, but not in contact with, reference ring 102 (hence the slightly greater radius of curvature of cutout portion 126 than of reference ring 102). This prevents friction and eliminates wear of conducting surface 128, but in addition has the side effect of introducing a capacitance in series with the variable capacitance between interrupted surfaces 114 and 118 and of the tool tip. Thus, it is found to be necessary that coupling shoe 122 and, correspondingly, conductive strip 128 possess as large an area as possible adjacent to plate portion 106 so that the coupling shoe capacitance is large, e.g., approximately 100 times the reference surface to tool tip capacitance. Otherwise, sensitivity of the system to variations in standoff distance is reduced, with consequent loss of system accuracy.

As will be understood, the construction of reference ring 102 is readily adaptable to use with three reference surfaces such as shown in FIGURE 7 or with the single surface of FIGURE 3. Further, as mentioned above, the reference ring may be directly mounted on machine tool spindle 104, i. e., without use of an intervening insulating layer 112. In that case, since the reference ring is grounded, it is necessary to electrically isolate the tool tip so that a varying capacitance to ground (i.e., from the tool tip) may be established. This may be accomplished in any suitable fashion, e.g., by use of a tool holder electrically insulated from the tool carriage shown in FIGURES 1 and 2. A material such as Mycalex, referred to above, is suitable for this purpose.

In FIGURES 11–13 are shown electronic block diagrams of portions of suitable electronic processing systems for use with the 1, 2, and 3 reference surface embodiments shown in FIGURES 3, 5, and 7. The embodiment of FIGURE 11 shows a single reference surface measuring system. Essentially, the system comprises an FM sensing oscillator 140, an FM demodulator 142, an AFC loop 166, filter means 144, a detector 146 and an output utilization circuit comprising a comparator circuit 148 and a display unit shown schematically as a meter 150. As previously explained, the varying distance between tool tip 42 and interrupted reference surface 48 (see FIGURE 3) causes a varying electrical capacitance. In FIGURE 11, this variable capacitance is shown schematically at 152, from which it will be understood that in accordance with the embodiments of FIGURES 9 and 10, the grounded end 154 of variable capacitance 152 represents the tool tip, while the other end 156 represents the reference surface. A frequency determining circuit 158, comprising an inductor 160 and a capacitor 162 (which includes coupling capacitance between the reference ring 102 and the coupling shoe 122 shown in FIGURE 9) is connected electrically in series between variable capacitor terminal 156 and an input 164 to FM sensing oscillator 140.

Frequency determining circuit 158 and oscillator 140 (e.g. a Clapp oscillator) combine to form a series tuned variable RF signal source, however any equivalent FM oscillator arrangement may be substituted. As will be recognized, the output frequency of oscillator 140 is determined by the reactance connected to input terminal 164. Thus, variation in the capacitance between the reference surface and the tool tip frequency modulates the output of FM sensing oscillator 140. Since the actual value of the apparent capacitance between the tool tip and the reference surface depends on the actual standoff distance, on the oscillator frequency and on the serration depth $\Delta R$, the output of FM sensing oscillator 140 in the embodiment described herein, will have the following properties.

(a) The average frequency $\overline{f_S}$ is held substantially constant by the AFC loop 166.

(b) The frequency deviation of the oscillator output is directly related to the standoff distance S, and to the serration depth $\Delta R$, i.e., the frequency varies above and below $\overline{f_S}$ in proportion to the standoff distance S and to $\Delta R/2$. (The rate of change of the average standoff distance for typical tool positioning systems may be assumed to be so slow in comparison to the frequency $\overline{f_S}$, that for purposes of signal analysis, a constant standoff position may be assumed.)

(c) The rate of change of frequency $f_S$ is primarily a function of the frequency of interruption $f_R$. (Again, the rate of change of the standoff distance in comparison to the frequency $f_R$ is quite small.)

Small components at other frequencies, e.g. due to run-out or vibration, may exist but they will usually be quite small and their effect on system operation may be eliminated by average detection as explained below.

FM demodulator 142 is of conventional design, and serves to convert the RF output of oscillator 140 to an audio signal centered at the interruption frequency $f_R$. Due to the modulation properties set forth above, demodulator 142 is characterized by a modulation envelope related to $\Delta R$ and to any existing run-out present in the spindle or reference ring. On the other hand, the average amplitude is proportional to the average standoff distance between the tool tip and the reference surface. This signal is isolated from the demodulator output by means of filter means 144 centered at frequency $f_R$.

Filter 144 is sufficiently wide band to pass the entire signal spectrum associated with the interruption frequency $f_R$. This assures inclusion of the amplitude modulation components and also avoids extremely tight tolerance on spindle rotation speed, i.e., extremely accurate control of frequency $f_R$. In practice, a band pass filter having a ratio between upper and lower cut off frequencies of about 2:1 or 1.5:1 is quite satisfactory.

The average value of the filter output, proportional to the standoff distance, is measured by an average detector 146, the output of which represents the average standoff distance $\overline{S}$ between the tool tip and the reference surface. Use of the average detector eliminates effects of run-out or other modulation effects on the standoff distance signal.

In its simplest form, a system utilizing the average standoff signal obtained as described above comprises a comparison circuit 148 for subtracting a reference signal provided by distance reference 168 from the average value signal provided by detector 146. Thus, the output of comparator 148 equals the difference between the actual average standoff distance $\overline{S}$ and the desired average standoff distance $R_0$. This signal may be displayed on a suitable meter 150 which provides plus or minus signals indicating the deviation of the tool tip position from the required zero position.

In FIGURE 12 is shown a modification of the system of FIGURE 11 for use with the two surfaced reference ring 60 shown in FIGURE 5. Here, a pair of variable capacitors 170 and 172 representing the two reference surfaces 62 and 64 in FIGURE 5 are shown connected in parallel between ground at 174 and a coupling circuit 176 comprising a series capacitor 178 and an inductor 180. Again, referring to the embodiment shown in FIGURE 9, ground point 174 represents the tool tip while capacitor 178 includes the capacitance between reference ring 102 and coupling shoe 122.

The output of coupling circuit 176 is connected to an input 182 of an FM sensing oscillator 184. As in the embodiment of FIGURE 11, the variable reactance appearing at terminal 182 determines the output of FM sensing oscillator 184 according to the three criteria set forth above. However, in the present case, there are two variable capacitors 170 and 172 which cause periodic variations in the reactance at terminal 182. Thus, the output of FM sensing oscillator 184 is now representative of the variations in the distance from the tool tip to each of the reference surfaces 62 and 64 in FIGURE 5. It has been found, however, that the principle of superposition applies whereby the instantaneous output of FM sensing oscillator 184 may be determined by adding the independent effects described in connection with FIGURE 11. It will be recalled, however, that the frequency of oscillation $f_Y$ is approximately $\frac{1}{3}$ $f_X$. Thus, the output of FM sensing oscillator 184 is a complex waveform having components at both the frequencies $f_X$ and $f_Y$ which provide information as to the average standoff distances $\overline{S_X}$ and $\overline{S_Y}$.

An FM demodulator 186, similar to that described above, produces an amplitude modulator output including the effects of both X and Y oscillation. This output is provided to a pair of similar processing channels 188 and 190. Processing channel 188 includes a band pass filter 192 centered at the frequency $f_X$, an average detector 194, and a variable sensitivity control 196. Sensitivity control 196 may be a simple variable resistor serving to control the gain of the processing channel. This permits "weighing" the effect of the $S_X$ output relative to the $S_Y$ output in accordance with the angle $\phi$ (see FIGURE 6a) or to accommodate a standoff distance $X_o \neq Y_o$. Alternatively, sensitivity control 196 may include an active or passive non-linear circuit of conventional construction which operates to change system gain to compensate for the ($X^{-n}$) relationship between capacitance and distance so that the output appearing at terminal 198 is linearly related to the standoff distance between the tool tip reference point 76 and the reference surface 62 (see FIGURE 6a).

Similarly, processing channel 190 includes a band pass filter 198 centered at the frequency $f_Y$, an average detector 200, and a sensitivity control 202 similar to sensitivity control 196. Processing channels 188 and 190 operate in the manner described in connection with FIGURE 11 to provide signals at output terminals 204 and 206 respectively, representative of the average standoff distances $\overline{S_X}$ and $\overline{S_Y}$. A pair of comparator circuits 208 and 210 are connected to outputs 204 and 206 respectively, and to X and Y reference signal sources 212 and 214. Thus, the output of comparator 208 is indicative of the error in the average standoff distance $\overline{S_X}$, i.e., $\overline{S_X}-X_o$, while the output of comparator 210 is indicative of the error in the average standoff distance $\overline{S_Y}$, $\overline{S_Y}-Y_o$. Since proper selection of $\overline{S_X}$ and $\overline{S_Y}$, as shown in FIGURE 6a, will result in the desired positioning of the tool tip, the output of comparators 208 and 210 may be used for automatically controlling positioning motors 28 and 30 (see FIGURE 1) to achieve the desired zero position.

In addition, the system of FIGURE 12 preferably includes an approach path locus generator which comprises a comparator circuit 216 connected to the outputs of sensitivity control circuits 196 and 202. Comparator 216 may simply comprise a ratio circuit whereby an output on lead 218 serves as "steer left"-"steer right" control, with a departure from unity ratio between the two signals controlling the approach path. This permits establishment of any desired approach path, for example, parallel to one of the axes until a predetermined standoff distance is achieved (as indicated by the standoff distance ratio on lead 218) followed by approach along any desired path to maintain the final standoff distance ratio.

An additional refinement is preferably provided by a pair of level detectors 220 and 222, connected to the standoff distance outputs 204 and 206. These circuits are adjusted to trigger at predetermined standoff distances to permit the initiation of vernier control during the final position adjustments. Thus, as shown in FIGURE 12, the output of level detectors 220 and 222 are connected to an OR circuit 224 which provides an approach warning signal on lead 226 when either the X or Y critical standoff distance is reached.

Referring now to FIGURE 13, there is shown an electrical system suitable for use with the three-surfaced reference ring embodiment shown in FIGURE 7. Here, three variable capacitors 228, 230, and 232, representative of the capacitance between the tool tip 98 and reference surfaces 84, 86, and 94, respectively, are shown connected from ground at 233 through a series coupling network 234 including capacitance 236 and inductance 238 to the input 240 of an FM sensing oscillator 242. FM sensing oscillator 242 is identical to oscillators 140 and 184 shown in FIGURES 11 and 12 and is connected to an FM demodulator 244 again of the type shown in FIGURES 11 and 12. The output of demodulator 244 is provided at terminal 246.

A first processing channel 248, connected to terminal 246, comprises a band pass filter 250 centered at frequency $f_R$, an average detector 252, and a comparator 254 connected to average detector 252 and to a distance reference source 256. A second processing channel 258 is connected to demodulator output 246 and includes a narrow band pass filter 260 centered at frequency $f_X$, and average detector 262 and a variable sensitivity control 264. A similar processing channel 266, including a narrow band pass filter 268 centered at frequency $f_Y$, an average detector 270 and a variable sensitivity control 272, is also connected to the FM demodulator output 246. A comparator 276 is connected to the outputs of both processing channels 258 and 266.

The operation of the circuit of FIGURE 13 may best be thought of in terms of the combined effects of the operation of the circuits of FIGURES 11 and 12. For example, the output of FM sensing oscillator 244 is a complex waveform additively combining the effects of the individual capacitance variations between the tool tip 98 and the three reference surfaces of reference ring 82. Similarly, FM demodulator output 246 includes three amplitude modulated signals, i.e., at the frequencies $f_X$, $f_R$, and $f_Y$, the amplitude variations of which signals are related to the serration depths $\Delta X$, $\Delta R$, and $\Delta Y$, respectively, and of average amplitude related to the average values of the standoff distances $\overline{S_X}$, $\overline{S_R}$, and $\overline{S_Y}$. In each case, the separate processing channels 248, 258 and 266, including filters at each of the three frequencies $f_X$, $f_R$, and $f_Y$, and variable sensitivity controls if desired, serve identical functions to those described in connection with FIGURES 11 and 12. Thus, the output of comparators 254 and 274 are provided over leads 276 and 278, respectively, to controller 36 which operates tool carriage positioning motors 28 and 30 (shown in FIGURE 1) for establishing both the required standoff distance and an approach path locus based on the ratios of the X and Y standoff distances.

As in FIGURE 12, a level sensing circuit 280 is preferably connected to the output of comparator 254 to provide an approach warning signal initiating fine adjustment of the tool tip position as the desired zero reference is approached.

Moreover, since the system of FIGURE 13 not only provides an indication of the average standoff distance between the tool tip and the reference ring, but also an indication of the ratio between the X and Y standoff distances, a measure of tool tip symmetry (indicative of tool wear) is obtained by positioning the tool tip at a previously measured and recorded zero position and determining the departure of the standoff distances $S_X$, $S_R$, and $S_Y$ from the values $X_o$, $R_o$, and $Y_o$. This, should periodic repositioning of the tool tip at the reference point reveal excessive or non-uniform tool wear, the tool tip may either be repositioned for a new zero position, discarded or resharpened prior to further use.

As previously set forth, practice of the present invention is not limited to the employment of the above-described single or multiple interrupted surface rotating reference rings. FIGURE 14 shows a modified three coordinate reference system of the type shown in FIGURE 7 which employs three discrete probes instead of the three surfaces on the rotating reference ring. As shown, three identical probes 284a–284c are positioned at 45° intervals around the zero reference point and cooperate with the approaching tool tip 285 to provide variable field properties which may be related to the probe to tool tip distances. As in the previously described embodiments, separation of electrical signals representing each of the probe to tool tip distances is provided by introducing a controlled variation about a normal average standoff distance for each of the probes as explained below.

Probes 284a–284c may comprise conductive tips 286a–286c and coaxial conductive cylinders 288a–288c electrically separated from the probe tips 286a–286c. This results in a coaxial capacitor in series with a probe tip to tool tip capacitance for each of the probes 284a–284c, Cylinders 288a–288c are connected in parallel to produce a parallel capacitance network shown in FIGURE 15. Here, the fixed coaxial capacitors are denoted as 290a–290c, while the tool tip to probe variable capacitors are denoted as 292a–292c.

Referring again to FIGURE 14, most satisfactory operation is found to result if the coaxial capacitance is in each case very small in comparison to the tool tip to probe tip capacitance. Under these circumstances, the electrical capacitance of the network of FIGURE 15 accurately reflects variations in the standoff distance with respect to each of the three probes 284a–284c.

Controlled variation in the distances $S_X$, $S_R$, and $S_Y$ is provided by means of three bimorph crystal drivers 294a–294c coupled to the conductive probe tips 286a–286c through rigid insulating support members 296a–296c. Bimorph drivers 294a–294c are piezoelectric vibrators similar to that shown in assignee's copending U.S. patent application Ser. No. 333,335, of George B. Foster, filed Dec. 26, 1963, and entitled "Non-Contacting Displacement Gauge."

As explained in detail in the aforementioned patent application, the crystal driver units each comprise a pair of metal plates separated by a piezoelectric crystal spacer. Conductors are attached to the surfaces of the conducting plates. This assembly is rigidly supported at its periphery within a suitable housing so that under the influence of an oscillating electrical signal applied to the two conducting plates, mechanical vibration normal to the plate surfaces is induced. In the present case, the drivers are energized by electrical power sources 298a–298c. By the use of such vibrating piezoelectric structures, it is possible to obtain an accurately controlled variation in the probe tip to tool tip standoff distance of amplitude and frequency controlled by the amplitude and frequency of the power sources 298a–298c.

Identification of the components of the capacitance for each probe is achieved as in the embodiment of FIGURE 7 by selecting the frequency of the outputs of drivers 298a–298c to be unequal. In use, the lead 300 shown in FIGURE 14 is connected as a variable reactance to a controlled input for a variable reactance frequency modulated oscillator similar to those shown in FIGURES 11 through 13. Operation with the variable reactance system shown in FIGURES 14 and 15 is substantially identical to that previously described.

In connection with the discrete capacitive probe embodiment described above, it should be noted that since the standoff distance variation is controlled within a range dictated by the construction of the bimorph bender 390, it is possible to adjust the operation of one or more of probes 284a–284c for variable amplitude operation if desired. In particular, it has been found desirable in some instances to control the amplitude, for example, of probe 284b, measuring the standoff distance $S_R$, to maintain a constant ratio between the amplitude $\Delta R$ and the average standoff position $\overline{S_R}$. This has the effect of linearizing the electrical output of the processing system whereby a linear relationship between standoff distance and output voltage is achieved. A suitable modification of the $S_R$ channel of the system of FIGURE 13 to achieve this would simply require the connection of the output of comparator circuit 254 through a suitable level control circuit to control the amplitude of oscillation of the power source 298b. Similarly, if desired, variable drive amplitude could be provided for each of the other sensors as well. As previously noted, a similar effect can be achieved in the reference ring embodiments previously described by constructing the sensitivity control circuits such as 264 and 272 shown in FIGURE 13 to provide an output, i.e., a gain, which is inverse to the nonlinear functional relationship between the standoff distance and the capacitance.

In addition to the above, sensing systems which are responsive to perturbations in fields other than electric fields may readily be employed in the practice of the present invention. For example, under some circumstances the dielectric properties of the space between the sensor (or reference ring) and the tool tip may be subject to random fluctuations. In some cases, the presence of lubricants or coolants used during the cutting operation would result in wide variation in the apparent tool tip to sensor capacitance. Under such circumstances, there may be employed a reluctance type sensor such as that disclosed in assignee's copending U.S. application of George B. Foster, Ser. No. 553,263, filed May 17, 1966, entitled "Non-Contacting Vibration Analyzer." Such a system is readily constructed in the form of that shown in FIGURE 14 with a series of discrete probes disposed around the zero reference point. Also, a variable reluctance sensor employing one or more interrupted surfaces on a rotating reference ring may also be used. Other magnetic effects, such as the Hall effect, might also be employed. In short, it has been found that many non-contacting sensing systems can be used by which there may be established and sensed variations in an energy field caused by relative movement in one or more directions between the tool tip and the sensing body.

For discrete sensors such as described in connection with FIGURES 14 and 15, a mounting fixture such as that shown in FIGURE 16 is preferably employed. The mounting fixture, denoted at 306, comprises a housing 308 and a rotatable support plate 310. A series of probes 312a–312c are mounted in the vicinity of the zero reference point 314 in any suitable fashion to permit the required freedom of axial motion if necessary or in any other fashion consistent with the particular probes used.

A graduated scale 316 is provided on housing 308 and cooperates with a mark 318 on rotating support 310 to align the central probe 312b along the approach path 320 of the tool tip 322. A suitable locking mechanism (not shown), operated by a lever 324, may be employed to maintain rotating support 310 in any desired position. A mounting fixture as described above is quite desirable since the angular adjustment of the probes provides substantially equal standoff distance between tool tip 322 and the probes 312a and 312c when the tool tip is positioned over zero reference 314. While the same effect could be achieved by adjusting the sensitivity of the processing channels for the respective probes, e.g., by using sensitivity control circuits such as 264 and 272 shown in FIGURE 13, the construction of FIGURE 16 permits a rapid and convenient mechanical adjustment accommodating numerous approach angles of the tool tip.

Thus, there has been described above an improved tool tip positioning system providing convenience and accuracy heretofore unavailable. This system is readily adaptable to either manual or automatic control and may be employed in any machine tool application for which establishment of an initial zero reference is either essential or desirable. Due to the variety of sensors which may be used, the invention may be applied to use with tool tips of any type of contaminated as well as clean environments.

Modification of the electrical system disclosed is also possible. For example, frequency modulation need not be employed, though it has been found to be quite convenient. Any other means for identifying and processing the distance varying field phenomena herein described may be used within the scope of this invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a machine tool, a positioning system for a cutting tool tip comprising: a zero reference mark fixed with respect to the machine tool, transducing means including means for establishing a field in the vicinity of the zero reference mark, the energy distribution associated with the field being a function of the location of the cutting tool tip, means for introducing a predetermined cyclic variation in the energy distribution in the field, circuit means coupled to the transducing means for providing an indication of variations in the field energy and control means for adjusting the position of the cutting tool tip in accordance with the indication provided by the circuit means, thereby to establish the desired tool tip location relative to the zero reference mark.

2. The positioning system of claim 1 where the means of introducing the predetermined cyclic variation in the energy distribution comprises means for producing a time variation of the spacing between the tool tip and a portion of the transducing means.

3. The positioning system of claim 2 where the means for varying said spacing comprises a rotating member having one or more reference surfaces, each including a plurality of surface interruptions for causing undulation of the reference surfaces.

4. The positioning system of claim 3 where the frequency of said undulation is different for each reference surface, and where the circuit means includes means independently responsive to energy variations at each frequency.

5. The positioning system of claim 3 including first and second interrupted reference surfaces disposed in fixed relationship to each other and to the zero reference mark, and where the location of the zero reference mark is defined in terms of a predetermined average distance from each reference surface to the periphery of the approaching tool tip.

6. The positioning system of claim 5 including a third interrupted reference surface intermediate the first and second reference surfaces, disposed generally normal to the axis of the approaching tool tip, and where the location of the zero reference mark is further defined in terms of the average distance from the approaching tool tip to the third interrupted reference surface.

7. The positioning system of claim 3 where the rotating member is mounted on the rotating spindle of the machine tool.

8. The positioning system of claim 1 where the means for establishing the field includes means for impressing an electrical potential between the transducing means and the tool tip, and where the current magnitude resulting from the impressed electrical potential is directly proportional to the time derivative of the potential and inversely proportional to some function of the distance between the tool tip and the transducing means.

9. The positioning system of claim 8 where the means for introducing the cyclic variation in the energy comprises means to vary periodically the spacing between the tool tip and a surface of the transducing means.

10. The positioning system of claim 9 where the means for varying said spacing comprises a rotating member having one or more reference surfaces, each including a plurality of surface interruptions for causing apparent undulation of the surface.

11. The positioning system of claim 9 where the means to vary said spacing comprises electro-mechanical means for vibrating the transducing means alternately to increase and decrease the spacing between the transducing means and the tool tip.

12. The positioning system of claim 1 where the means to vary the energy distribution in the field comprises means for periodically vibrating the transducing means alternately to increase and decrease the spacing between the transducer and the tool tip.

13. The positioning system of claim 12 where the transducer comprises one or more probe members, each connected to electro-mechanical oscillating means for independently increasing and decreasing the tool tip to probe member distance, the frequency of each electro-mechanical oscillator being different and where the circuit means includes means independently responsive to energy variations at each of the electro-mechanical oscillator frequencies.

14. The positioning system of claim 1 where the transducer comprises a rotating member including a first reference surface, the location of the zero reference mark being defined as a predetermined distance from the first reference surface, a series of interruptions disposed on the first reference surface to cause a substantially periodic undulation of the surface at a first frequency, and circuit means responsive to energy variations at the first frequency.

15. The positioning system of claim 14 where the rotating member includes second and third reference surfaces, each positioned adjacent to the first reference surface, and each including a series of interruptions disposed thereon to cause substantially periodic undulation of the surfaces at second and third frequencies, the first, second, and third frequencies being mutually unequal, and further circuit means responsive to energy variations at the second and third frequencies.

16. The positioning system of claim 15 where the control means is responsive to energy variations at the first frequency to adjust the radial distance between the tool tip and the transducer means, and responsive to the ratio of energy variations at the second and third frequencies to adjust the approach path of the tool tip.

17. The positioning system of claim 1 where the transducer means comprises a rotating member having first and second reference surfaces disposed in predetermined relationship to each other, the location of the zero reference mark being defined in terms of desired distances from each of the first and second reference surfaces to the periphery of the tool tip, a series of interruptions disposed on each of the reference surfaces to cause substantially periodic undulation of the reference surfaces at first and second unequal frequencies, and circuit means independently responsive to energy variations at the first and second frequencies.

18. The positioning system of claim 1 where the energy variation is characterized by components at one or more frequencies, all frequencies being sufficiently great that the energy variations associated therewith are relatively rapid in comparison to those related to the speed of tool tip movement, and where the circuit means include means for developing a first plurality of electrical signals, each proportional in amplitude to the energy variations at one frequency.

19. The positioning system of claim 18 where energy variations at each frequency are related to variations in the distance from the tool tip to different portions of the transducer means, and where the circuit means includes means for converting the first plurality of signals into a second plurality of signals, each representative of the distance between the tool tip and a different portion of the transducer means.

20. The positioning system of claim 1 where the location of the zero reference mark is defined in terms of distances from the tool tip to one or more portions of the transducer means, where the means to vary the energy distribution comprises means for periodically varying the distance to the portions of the transducer means at different identifying frequencies, each frequency being sufficiently great that energy variations associated therewith occur substantially faster than those associated with tool tip movement.

21. The positioning system of claim 20 where the circuit means includes means for developing a first signal proportional to the composite energy variation, means for separating the first signal into components at each identifying frequency, and means for extracting further signals from the components representative of the distance between the tool tip and the portions of the transducer means.

22. The positioning system of claim 21 where the control means is responsive to a first one of the further signals to adjust the distance between the tool tip and a first portion of the transducing means, and is further responsive to the ratio of second and third ones of the further signals to adjust the path along which the tool tip approaches the zero reference mark.

23. The positioning system of claim 21 where the means for developing the first signal comprises an oscillator, the output of which is modulated in accordance with variations of the energy distribution in the field, and demodulating means for converting the oscillator output to a signal having a component at each of the identifying frequencies, the average value of each component being representative of the distance from the tool tip to each of the portions of the transducing means.

24. The positioning system of claim 23 where the separating means comprises band-pass filter means centered at each of the identifying frequencies, and where the extracting means comprises average detector means connected to each of the band pass filter means.

25. A machine tool cutting tip wear detector comprising the positioning system described in claim 1, and further including tool tip support means, means for establishing the position of the support means relative to a fixed coordinate system, means for recording the position of the support means when the cutting tool tip is established at the desired location relative to the zero reference mark, means to re-establish the support means at the recorded location whenever tool tip wear is to be determined, and means for comparing the field energy distribution resulting from the desired tool tip position with that associated with the tool tip when repositioned, any differences detected being indicative of tool tip wear.

26. The wear detection system of claim 25 where the location of the zero reference mark is defined in terms of at least three independent distances relative to the transducing means each distance being associated with cyclic variation of field energy distribution at a different identifying frequency, and where the comparing means comprises means to measure independently and in selected pairs, the energy variations at the identifying frequencies.

References Cited

UNITED STATES PATENTS

| | | | |
|---|---|---|---|
| 3,119,291 | 1/1964 | Mizunuma et al. | 82—14 |
| 3,143,041 | 8/1964 | Namenyi-Katz | 90—16 |
| 3,189,805 | 6/1965 | Poepsel et al. | 318—28 |
| 3,211,896 | 10/1965 | Evans et al. | 235—151.11 |
| 3,284,618 | 11/1966 | Gotz et al. | 235—151.11 |

GERALD A. DOST, *Primary Examiner.*

U.S. Cl. X.R.

235—151.11; 318—18